(12) United States Patent
Aho

(10) Patent No.: US 7,575,435 B2
(45) Date of Patent: Aug. 18, 2009

(54) METHOD OF PROMOTING GROUP LEARNING

(76) Inventor: Richard Greggory Aho, 12 Burton St., Malverne, NY (US) 11565

( * ) Notice: Subject to any disclaimer, the term of this patent is extended or adjusted under 35 U.S.C. 154(b) by 481 days.

(21) Appl. No.: 11/600,390

(22) Filed: Nov. 16, 2006

(65) Prior Publication Data

US 2007/0141547 A1 Jun. 21, 2007

Related U.S. Application Data

(60) Provisional application No. 60/742,216, filed on Dec. 5, 2005.

(51) Int. Cl.
*A47B 39/00* (2006.01)
(52) U.S. Cl. ...................................... 434/432
(58) Field of Classification Search ................. 434/432; 108/64; 312/194, 195; D6/422, 423
See application file for complete search history.

(56) References Cited

U.S. PATENT DOCUMENTS

| | | | | |
|---|---|---|---|---|
| 3,727,328 A | * | 4/1973 | Valenzuela | 434/432 |
| 3,778,911 A | * | 12/1973 | Woolman | 434/432 |
| D239,061 S | * | 3/1976 | D'Elia | D6/423 |
| 4,382,643 A | * | 5/1983 | Heinrich | 312/195 |
| 4,732,088 A | * | 3/1988 | Koechlin et al. | 108/64 |
| 5,016,405 A | * | 5/1991 | Lee | 52/36.1 |
| 5,567,164 A | * | 10/1996 | Durkin et al. | 434/432 |
| 5,655,822 A | * | 8/1997 | Roberts et al. | 312/194 |
| 6,070,936 A | * | 6/2000 | Holland | 297/232 |
| 6,725,784 B2 | * | 4/2004 | Crinion | 108/64 |
| D569,142 S | * | 5/2008 | Burak | D6/511 |

* cited by examiner

*Primary Examiner*—Kurt Fernstrom
(74) *Attorney, Agent, or Firm*—Myron Amer P.C.

(57) ABSTRACT

Promoting of group learning by three students by physically attaching with a cover their desks so that by forced observation and interaction their learning is enhanced.

1 Claim, 2 Drawing Sheets

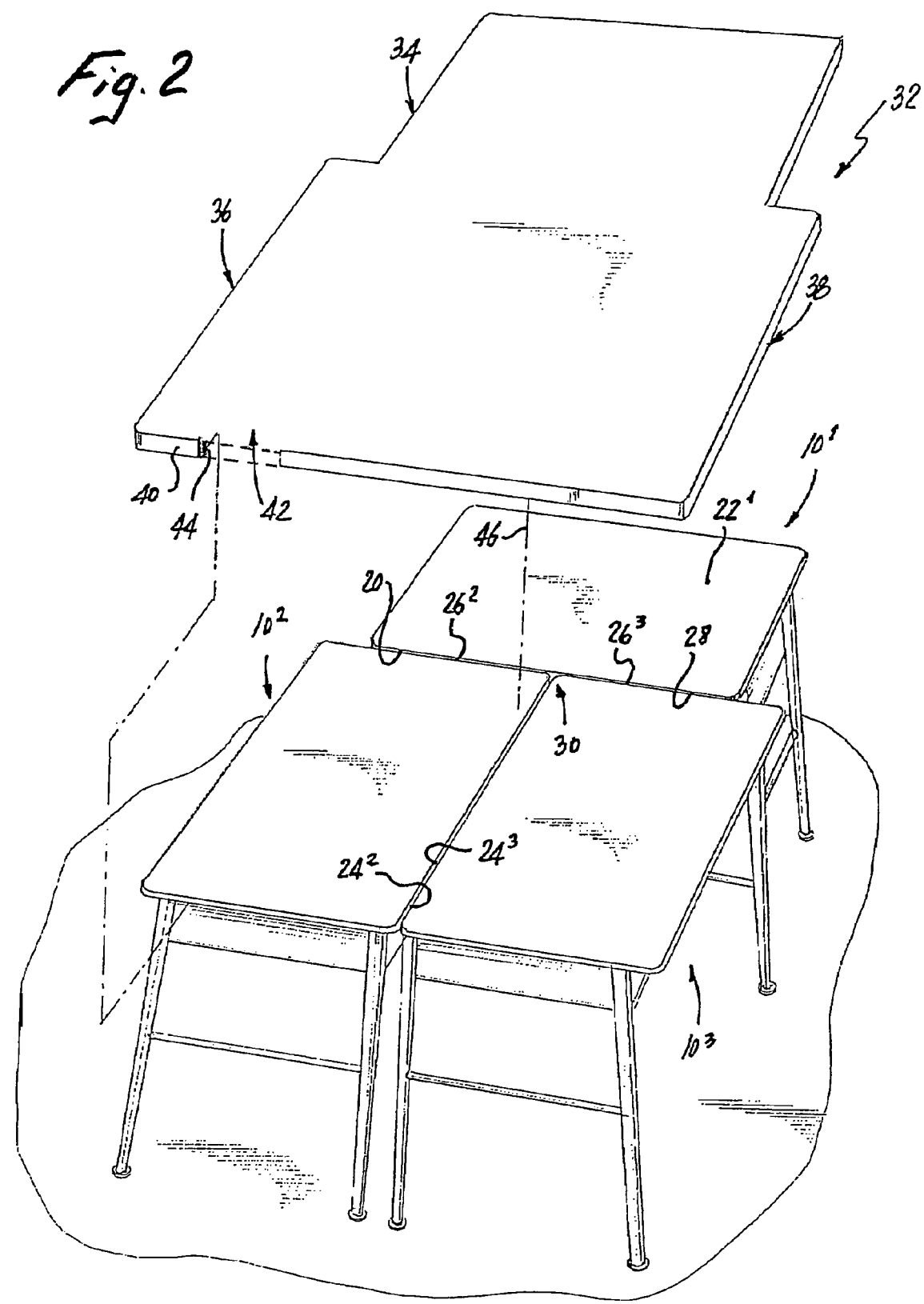

METHOD OF PROMOTING GROUP LEARNING

BACKGROUND OF THE INVENTION

Field of Search

It is already known, as exemplified by U.S. Pat. No. 2,694,614 issued to C. H. Dent for "Multiple Desk Unit," and by U.S. Pat. No. 3,688,419 issued to Woolman on "Perception Convergence Device for Paired Learning" that there is an accruing benefit in delineating desk surface used by a group of students. This benefit, however, is not used to advantage to contribute to enhanced learning by the students for failure to appreciate the opportunity that is afforded by the close proximity of the students.

SUMMARY OF THE INVENTION

Broadly, it is an object of the present invention to overcome the foregoing and other shortcomings of the prior art.

More particularly, it is an object to obviate the privacy of each student prompted by the delineation of their work area and instead to promote interactivity of the students to enhance learning, all as will be better understood as the description proceeds.

BRIEF DESCRIPTION OF THE SEVERAL VIEWS OF THE DRAWINGS

The description of the invention which follows, together with the accompanying drawings should not be construed as limiting the invention to the example shown and described, because those skilled in the art to which this invention appertains will be able to devise other forms thereof within the ambit of the appended claims.

FIG. 2 is a modified arrangement which promotes group learning in accordance with the present invention.

DETAILED DESCRIPTION OF THE INVENTION

Figure 1:
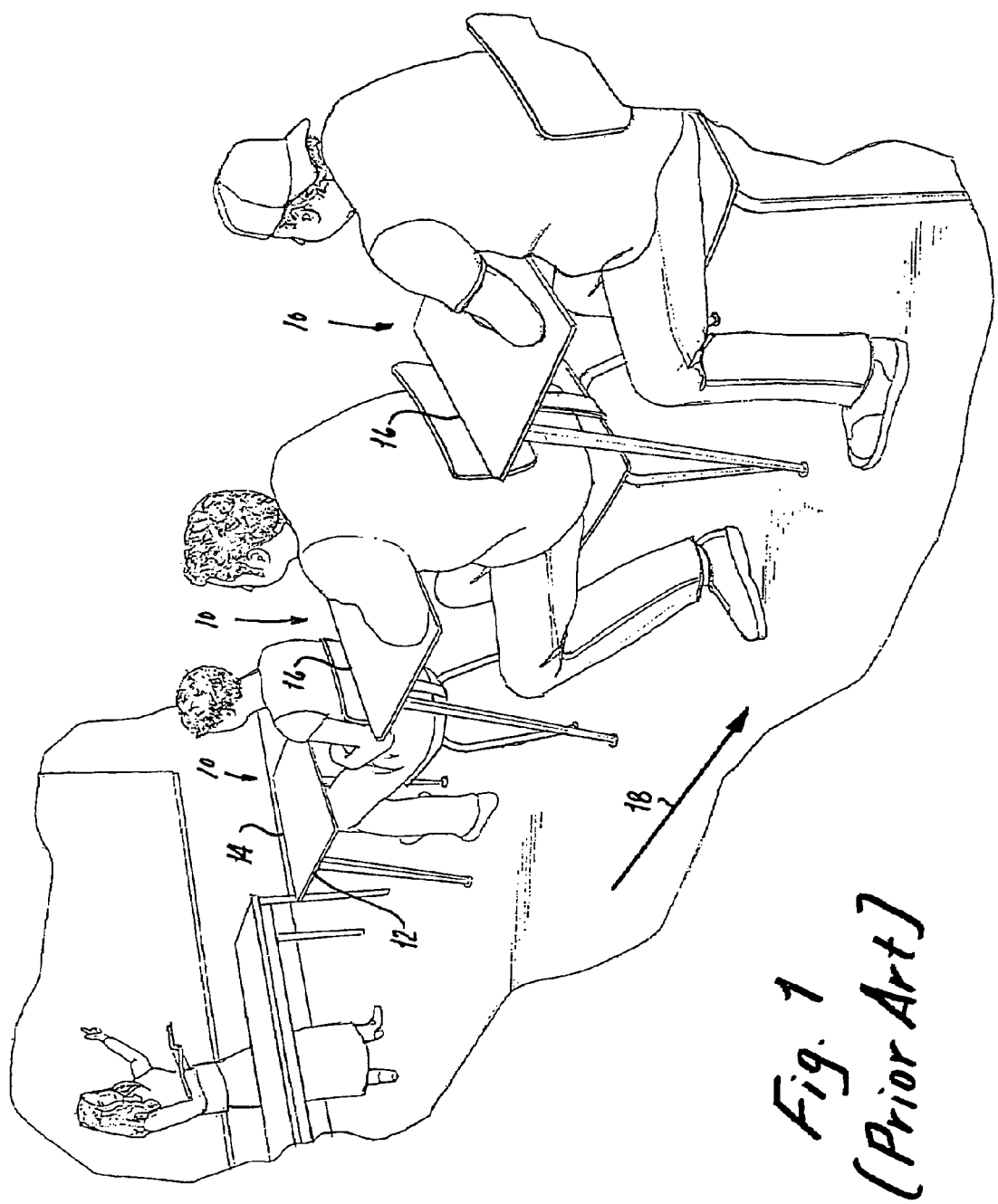
FIG. 1 is a perspective view of a prior art desk arrangement in a school environment.

Group learning is the term which is used herein to summarize a new operational theory of public, and also possible private, school instruction. According to this theory, the individual child student learner learns instructional content more efficiently in a mutually interactive fashion both in terms of mental retention and required completion time than in the situation wherein the individual learner works his way along through a body of instructional content isolated from fellow students.

This increased efficiency holds for both the situation where the individual learner is reading a textbook as well as where the individual learner is self-pacing himself through a course of programmed instruction. In practice this operational theory results in students quickly becoming motivated by mutually interactive group learning with their respective partners and thus overcoming the frequently observed boredom syndrome associated with highly individualized learning routines.

In addition, this new group learning operational theory presents a number of additional advantages over conventional individualized instruction. Primary among these advantages is that language learning is greatly facilitated by a group learning context since language is fundamentally a didactic process requiring at least two persons. This greater efficiency in language learning holds for all language learning situations including the initial learning of a single language, the learning of a second language, and the learning of various levels of specialized technical languages.

The second advantage is that in a group learning context the social interaction skills of the students are greatly enhanced. The students, due to the fact that they are continually working with another student, rapidly increase their level of social interaction and since the learners may be rotated into and out of various grouped situations the classroom of learners rapidly generates a micro-society in which mastery of the presented instructional content with another student permits the development of new roles such as monitor and evaluator which is a status generating activity within the micro-society of the classroom.

Another benefit offered by the group learning theory is that in this context the number of responses made by the learners to the programmed course content is much higher than in the traditional stand-up learning classroom wherein students only occasionally make learning responses. The increased response rate and the absence of boredom due to required social interactions with the other learners of the group result in a greater willingness to maintain involvement in learning tasks until a learning goal has been reached and also increases the feelings of satisfaction in having achieved those goals These advantages allow the classroom to become a major life situation for all learners rather than just of primary importance to the few highly motivated learners who respond to the teacher in conventional classrooms. In such a micro-society as is generated by group learning, no student can operate in a behavioral pattern of non-response and, therefore, reduced learning efficiency.

The desks shown in the drawings, individually and collectively generally designed 10, are as school furniture articles of manufacture provided with a uniform sized top or work surface of 18 inches by 24 inches, denoted at 12 and 14, and in varying heights adjusted for the size of students in elementary, junior high school, and senior high school, thus providing the advantages of group learning to students from kindergarten through the $12^{th}$ grade.

As shown in FIG. 1, the three desks 10 used as an example herein of current or prior art practice, are arranged in spaced part relation, as noted at 16, and thus in a row isolating the individual students, individually and collectively designated 18, from each other.

In contrast to FIG. 1, in FIG. 2 the arrangement is of a three-desk T-shape with desk $10^1$ in the location of the leg of the T-shape and presenting the forward edge 20 of the top surface $22^1$ in a position of accessibility, and the other two desks $10^2$ and $10^3$ arranged end edge $24^2$ to end edge $24^3$ and thusly arranged, positioned with the side portions $26^2$ and $26^3$ in contact against the assessable edge 28 of desk $10^1$, the edges $24^2$, $24^3$ occupy a medial location along the edge $10^1$, as noted at 30.

The students, individually and collectively designated 18 in FIG. 2 are thus physically in an interactive position to benefit from group learning.

To promote group learning afforded by the desks' arrangement of FIG. 2, use is made of a flat or planar cover, generally designated 32, of appropriate wood panel construction material selected for handling and durability, having extensions 34, 36, and 38. The flat cover 32 is embodied with nominally size peripheral depending lips 40 appropriately attached in encircling relation about the extensions 34, 36 and 38, which in cooperation with the bottom surface of the flat cover 32 bound a fitting compartment 42 with the inboard surfaces 44 of the lips 40, and thus the placement 46 of the cover 32 over the desks 10¹, 10² and 10³ in projected relation within the fitting compartment 42 stabilizes the desks' arrangement of FIG. 2 and implements the promotion of group learning.

While the method of promoting group learning herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of promoting group learning of three school children in a classroom environment comprising the steps of:
   A. using three desks each characterized by a similar leg-supported top work area;
   B. arranging said desks
      1. with two of said desks in adjacent side-by-side contact presenting an attachment site along a common side, and
      2. with said remaining desk in perpendicularly extending relation of a front edge thereof in contact adjacent said attachment site of said two desks;
   C. placing a flat cover of a shaped configuration matching a shape of said arranged three desks;
   D. attaching a nominally sized depending lip to a peripheral edge of said flat cover so as to bound a fitting compartment delimited by an underside surface of said flat cover and inboard surfaces of said depending lip; and
   E. inserting into said fitting compartment said arranged three desks;

whereby a seating of three school children about said desks fitted with said cover contributes to group learning of the three students.

* * * * *